US006564141B2

United States Patent
Weisman, II, deceased (10) Patent No.: US 6,564,141 B2
(45) Date of Patent: May 13, 2003

(54) ENGINE DELAY COMPENSATION (75) Inventor: S. Miller Weisman, II, deceased, late of Grosse Point Park, MI (US), by Ann Rock, legal representative (73) Assignee: Detroit Diesel Corporation, Detroit, MI (US)

(*) Notice: Subject to any disclaimer, the term of this patent is extended or adjusted under 35 U.S.C. 154(b) by 0 days.

(21) Appl. No.: 09/795,857

(22) Filed: Feb. 28, 2001

(65) Prior Publication Data
US 2002/0148447 A1 Oct. 17, 2002

(51) Int. Cl.$^7$ .................... F02D 41/14; G05B 11/36

(52) U.S. Cl. ........................... 701/102; 700/72

(58) Field of Search ............... 701/101, 102; 700/72

(56) References Cited

U.S. PATENT DOCUMENTS 4,862,851 A * 9/1989 Washino et al. ....... 123/339.11
5,335,643 A * 8/1994 Abate et al. ................ 123/679

FOREIGN PATENT DOCUMENTS

JP 60-125741 * 7/1985 ........... F02D/41/14

* cited by examiner

Primary Examiner—Andrew M. Dolinar
(74) Attorney, Agent, or Firm—Brooks & Kushman P.C.

(57) ABSTRACT

An engine with transport delay represented by a delay period is controlled with a controller in the feed-forward path and a compensator in a negative inner feedback loop around the controller. The controller generates a control signal so as to control the engine as if the engine was without the delay. A compensation signal is generated as the sum of the control signal only over the delay period. The control signal is based on an error signal generated as the difference between a desired input and the sum of a controlled engine output and the compensation signal.

12 Claims, 8 Drawing Sheets

ENGINE DELAY COMPENSATION

TECHNICAL FIELD

The present invention relates to controlling internal combustion engines with inherent transport delay.

BACKGROUND ART

Internal combustion engines may have many parameters which must or may be controlled, including spark timing, fuel delivery, air intake, exhaust removal, emissions control, engine speed and torque, accessory control, and the like. Typically, the rotating mass of an engine has substantial inertia which inhibits immediate attempts to change engine parameters. This inertia is represented by integration when modeling the engine parameters.

The control problem is complicated by the presence of delay between when an engine parameter changes and when the corresponding change in a controlling signal occurs. Such delay may be caused by the response time of a sensor detecting the engine parameter, by computational time required to calculate the control signal, and by the response time of an actuator designed to affect the engine parameter. For example, the delay between when a control signal reaches a fuel injector and when the commanded amount of fuel enters the combustion chamber may be a significant factor in the fuel delivery controller design. Even if sensor, computational and actuator delays can be effectively eliminated, the engine itself may introduce delays. For example, piston engines produce discontinuous combustion at discrete points, limiting to specific ranges within each ignition cycle when control events may occur. Regardless of the cause, transport delays may result in over control and instability.

Another factor complicating the problem of engine control is the presence of disturbances in the engine. Disturbances may be any unwanted factor that influences the engine operation. Disturbances may be random, such as electrical noise picked up by sensors used to monitor engine parameters. Disturbances may also be dependent on engine operation, such as frictional losses or vibrations.

A typical model for a control system replaces the one or more engine parameters to be controlled with a linear model having an output for each controlled parameter and a corresponding input providing control signals. A controller, placed before the engine model in the control feed-forward path, provides the control signals. The input to the controller is one or more error signals found as the difference between desired levels for the controlled engine parameters and the actual engine parameter outputs fed back to the controller input. Disturbances are often modeled as an additive signal source in the feed-forward path after the controller.

One well known technique for delay compensation is to place a Smith compensator in an inner negative feedback loop around the controller. The Smith compensator feeds back a simulated engine parameter output to cancel the true engine parameter output and then adds a simulated engine parameter output without the transport delay. If the simulated engine parameter model and the delay value match the actual engine, the Smith compensator will precisely cancel the effects of the delay. However, for a controlled engine parameter subject to inertia, inaccuracies in the simulated engine model may result in saturation errors and the inability to achieve the desired engine parameter values.

Other techniques, such as the closed loop observer in a state-space controller topology, have also been proposed. However, these techniques tend to be complex and are sensitive to the closed loop observer gains.

What is needed is to control an engine with transport delay in a manner that compensates for delay without a substantial increase in complexity, without the need to accurately model engine parameters, and without the possibility of error saturation.

DISCLOSURE OF INVENTION

The present invention provides for control of an engine with inertial integration and delay through the use of a negative feedback compensator around the controller having a finite impulse response.

A system is provided for controlling an engine with transport delay measured as a delay period. The engine has a control input and a controlled output. A control having an error input drives the control input. A delay compensator generates a compensation signal based only on the sum of the controller output over the delay period. The error input is generated as the difference between a desired input and the sum of the controlled output and the compensation signal.

In an embodiment of the present invention, the delay period is approximated by mT, where T is the compensator sampling period. The controller output at the $n^{th}$ sampling period is found by summing the m previous controller outputs weighted by a constant K. The constant K may be based on the engine torque gain, the sampling period T, and the engine inertia.

A method is also provided for controlling an engine with transport delay. A control signal is generated for the control input. The control signal is determined so as to control the engine as if the engine was without the delay. A compensation signal is generated as the sum of the control signal only over the delay period. The control signal is based on an error signal generated as the difference between a desired input and the sum of the controlled output and the compensating signal.

An internal combustion engine with transport delay measured as a delay period is also provided. The engine has a plurality of controlled parameters. For at least one controlled parameter having a control input and a controlled output, the engine includes a feed-forward control path driving the control input with a control signal. The feed-forward control path is designed to provide closed-loop control of the controlled parameter without the presence of transport delay. A compensator generates a compensation signal based on the sum of the control signal only over the delay period. The compensation signal provides an input to the feed-forward control path.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
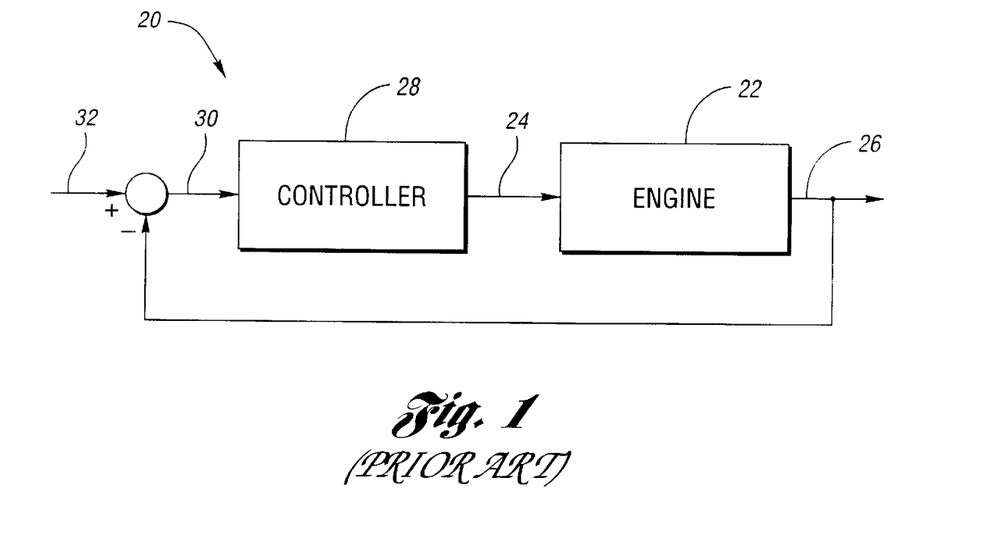
FIG. 1 is a block diagram of a prior art engine control system.

Referring to FIG. 1, a block diagram of a prior art engine control system is shown. An engine control system, shown generally by 20, includes one or more engine parameters to be controlled, represented by block 22. Engine parameters 22 have at least one control input 24 for modifying parameters 22 resulting in one or more controlled outputs 26. Without loss of generality, the remainder of this discussion will assume a single engine parameter 22 generating a single controlled output 26 based on a single control input 24. It will be recognized by one of ordinary skill in the art that the present invention is equally applicable to multiple parameters 22 with multiple control inputs 24 and controlled outputs 26.

Controller 28 generates control input 24 based on error signal 30. Error signal 30 is calculated as the difference between desired input 32 and controlled output 26. Closed-loop controller 28 is designed to control how controlled output 26 tracks desired input 32.

Figure 2:
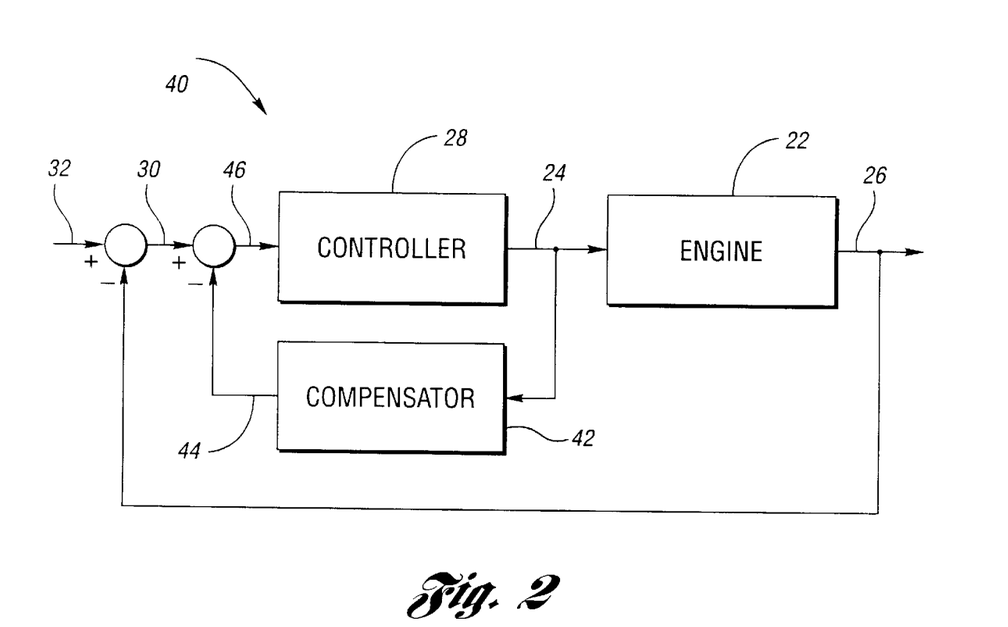
FIG. 2 is a block diagram of an engine control signal according to an embodiment of the present invention.

Referring now to FIG. 2, a block diagram of an engine control system according to an embodiment of the present invention is shown. The engine control system, shown generally by 40, now includes compensator 42 in a negative feedback loop around controller 28. Compensator 42 accepts as input control input 24 and generates compensation signal 44 which is subtracted from error signal 30 to produce error signal 46. Error signal 46 is the new input to controller 28.

Compensator 42 compensates for delay in engine parameters 22 by basing compensation signal 44 only on the outputs of controller 28 generated over the previous delay period associated with engine 22. Since compensator 42 has a finite impulse response, compensator 42 is not subject to the error saturation problems typical of integrating Smith compensators.

In an embodiment of the present invention, where the transport delay of engine 22 is measured as a delay period, compensation signal 44 may be found by Equation 1:

$$c(n) = K \sum_{i=1}^{m} y(n-i) \quad (1)$$

where $c(n)$ is compensation signal 44 at the $n^{th}$ sampling period, K is a constant, the delay period is approximated by mT, T is the compensator sampling period, and $y(n)$ is control input 24 at the $n^{th}$ sampling.

The value of constant K may be set experimentally. Preferably, K is based on engine parameters and the sampling period T. For example, the constant K may be expressed as in Equation 2:

$$K = \frac{G \times T}{I} \quad (2)$$

where G is the engine gain for parameter 22 such as, for example, the engine torque gain, and I represents the inertia of engine 22.

FIGS. 3–14 provide block diagrams and signal plots of simple control systems illustrating problems encountered with previous systems and the merits of the present control system.

Figure 3:
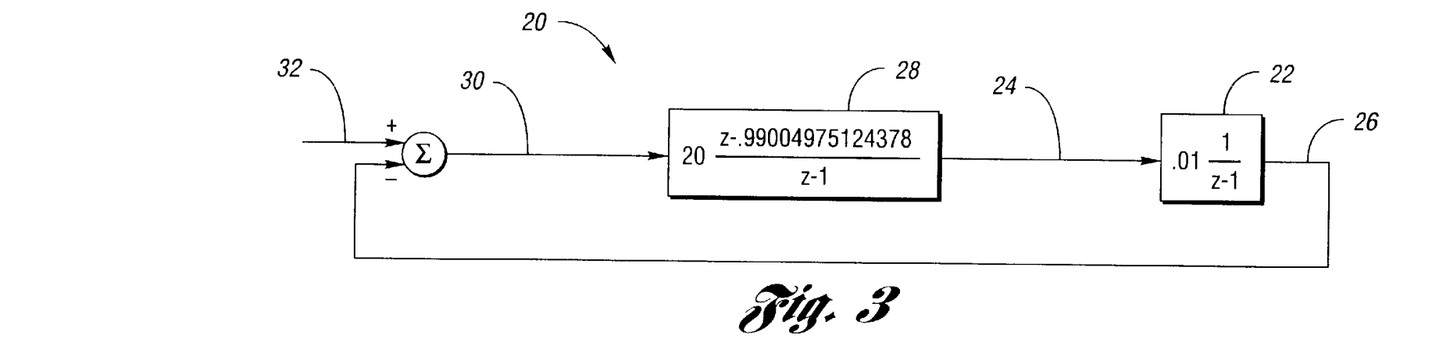
FIG. 3 is a block diagram of an exemplary engine control system without transport delay.

Referring now to FIG. 3, a block diagram of an exemplary engine control system without transport delay is shown. Control system 20 includes engine parameter 22 modeled as a first order Z-transform transfer function with inertia-based integration but without transport delay. Controlled output 26 is subtracted from desired input 32 to produce error signal 30. Controller 28 generates control input 24 based on error signal 30.

Figure 4:
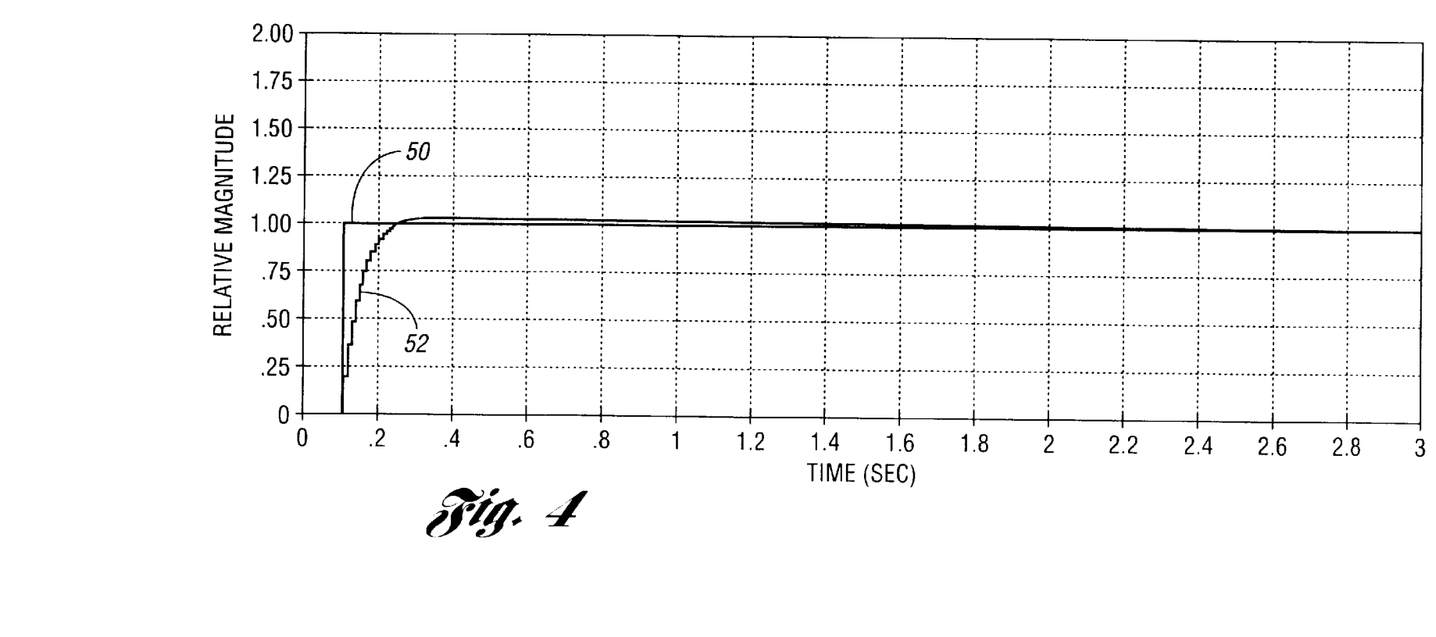
FIG. 4 is a graph of signals for the system modeled in FIG. 3.

Referring now to FIG. 4, a graph of signals for the system modeled in FIG. 3 is shown. Plot 50 represents a unit step input on desired input 32. Controller 28 has been designed such that controlled output 26 exhibits a slightly underdamped response with rapid settling time.

Figure 5:
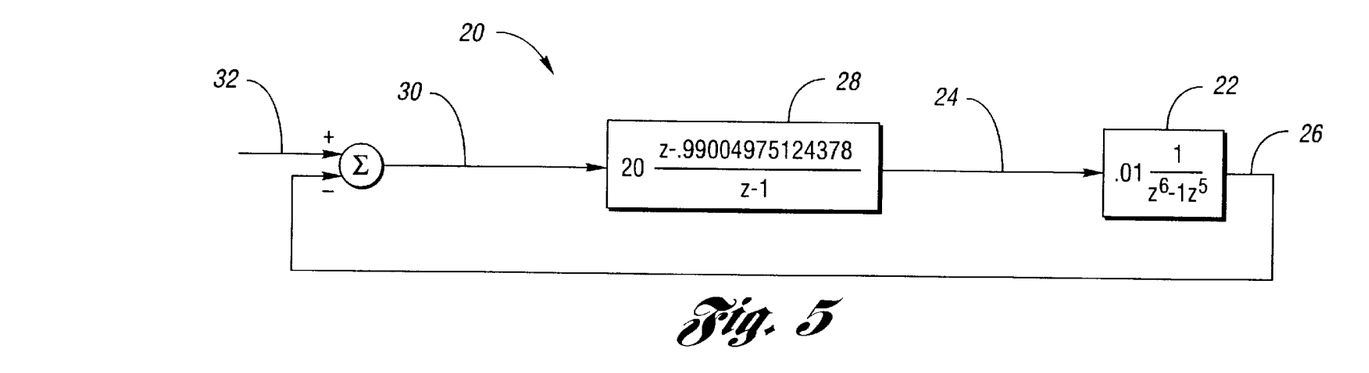
FIG. 5 is a block diagram of an exemplary engine control system with transport delay.

Referring now to FIG. 5, a block diagram of an exemplary engine control system with transport delay is shown. The transfer function for engine parameter 22 now includes the term $z^{-5}$ representing a transport delay of five sampling periods.

Figure 6:
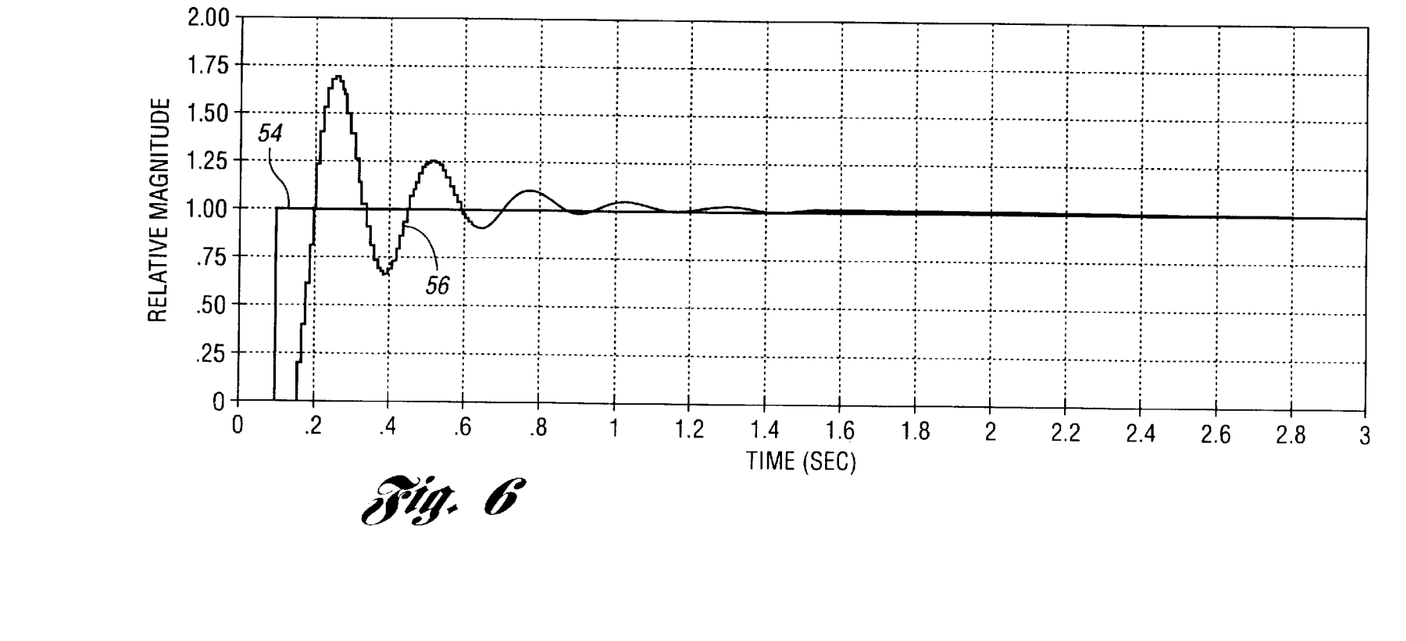
FIG. 6 is a graph of signals for the system modeled in FIG. 5.

Referring now to FIG. 6, a graph of signals for the system modeled in FIG. 5 is shown. Plot 54 is the unit step on desired input 32. The resulting signal on controlled output 26 is shown by plot 56. Controlled output 26 is now severely underdamped with a considerably longer settling time. The overshoot and increased settling time is due to the fact that controller 28 receives no feedback from engine parameter 22 for a given change in control signal 24 over five sampling periods. Hence, controller 28 continues to drive control input 24 with delayed information about the state of engine parameter 22.

Figure 7:
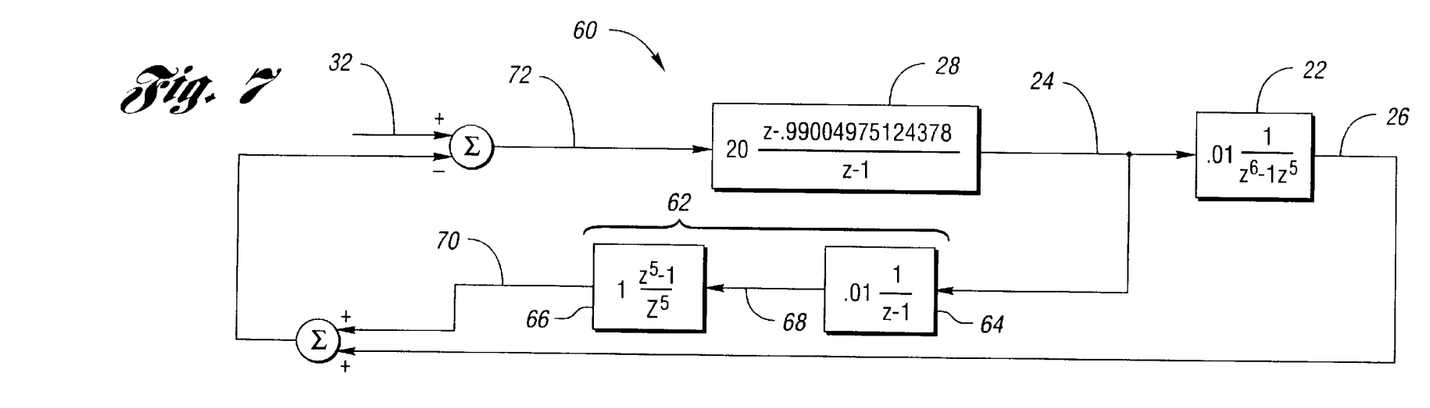
FIG. 7 is a block diagram of an exemplary engine control system with transport delay incorporating a Smith compensator.

Referring now to FIG. 7, a block diagram of an exemplary engine control system with transport delay incorporating a Smith compensator is shown. A control system, shown generally by 60, now includes Smith compensator 62. Smith compensator 62 includes delay-free engine model 64 accurately modeling engine parameter 22 without delay. Smith compensator 62 also includes delay differencer 66. Delay differencer 66 generates as compensator output 70 the difference between the current model output 68 and the model output 68 generated at a previous time equal to the delay in engine parameter 22. Error signal 72 is then the difference between desired input 32 and the sum of controlled output 26 and compensator output 70.

Figure 8:
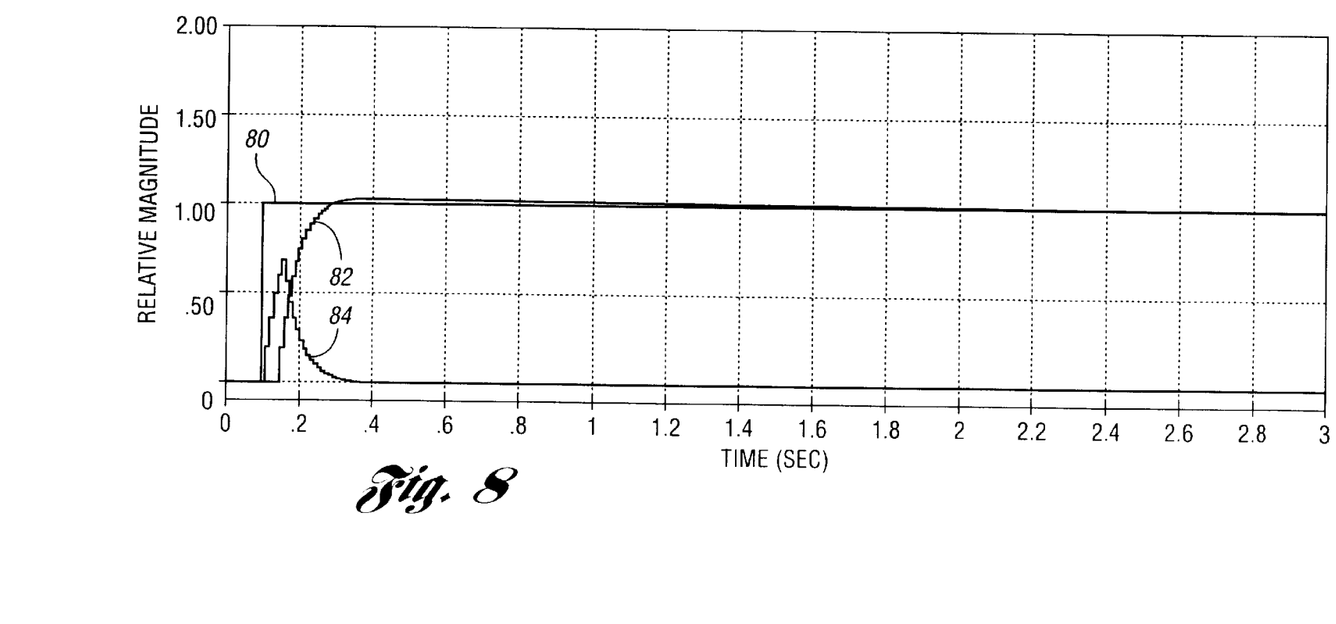
FIG. 8 is a graph of signals for the system modeled in FIG. 7.

Referring now to FIG. 8, a graph of signals for the system modeled in FIG. 7 is shown. Plot 80 illustrates a unit step input on desired input 32. Controlled output 26, shown by plot 82, tracks exactly the delay-free result originally obtained by controller 28. Plot 84 illustrates compensator output 70 required to achieve controlled output 26.

Figure 9:
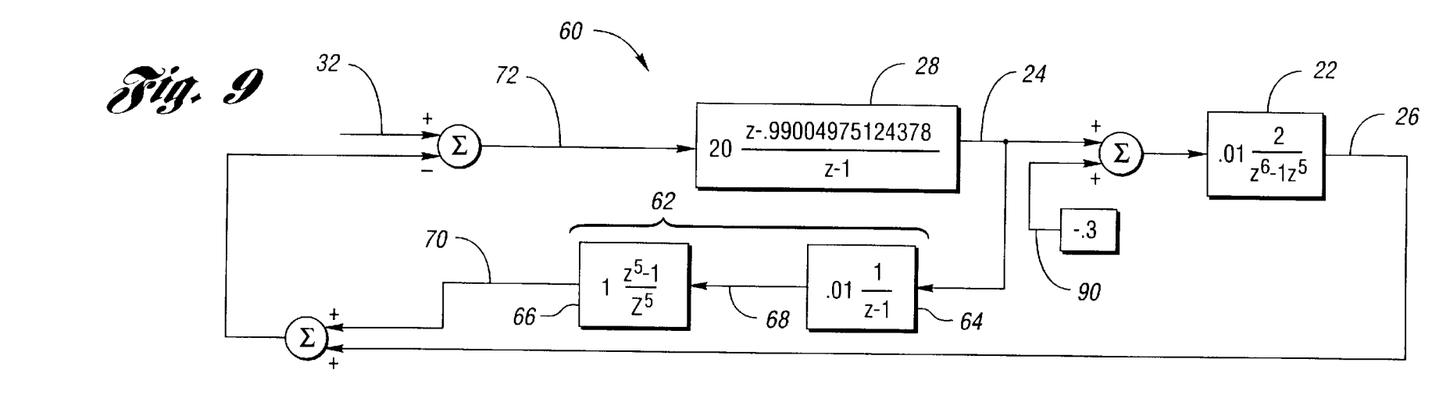
FIG. 9 is a block diagram of an exemplary engine control system with transport delay incorporating a Smith compensator with model errors.

Referring now to FIG. 9, a block diagram of an exemplary engine control system with transport delay incorporating a Smith compensator with model errors is shown. The open-loop gain for engine parameter 22 is now doubled. Hence, delay-free engine model 64 no longer correctly represents engine parameter 22. Also, engine parameter 22 is subject to constant disturbance input 90.

Figure 10:
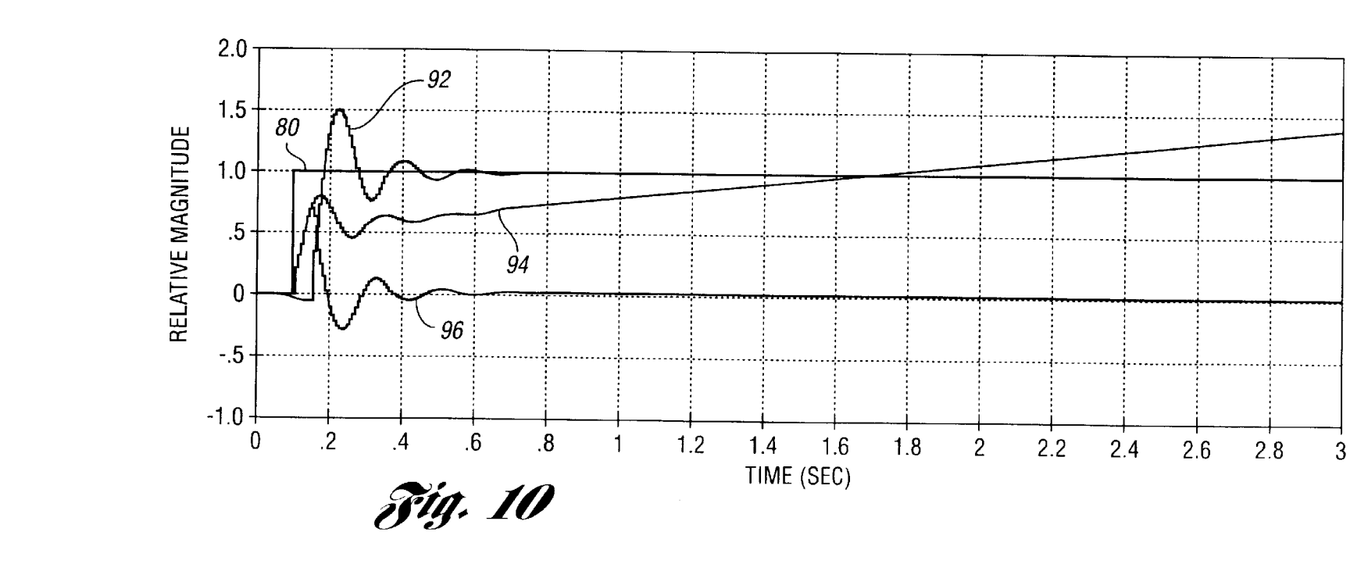
FIG. 10 is a graph of signals for the system modeled in FIG. 9.

Referring now to FIG. 10, a graph of signals for the system modeled by FIG. 9 is shown. Plot 90 is a unit step input on desired input 32. Controlled output 26, as indicated by plot 92, exhibits greater overshoot and settling time prior to following step input 90. Compensator output 70 settles to zero at the same rate as controlled output 26 as indicated by 96. However, as indicated by plot 94, model output 68 continues to ramp due to the inaccuracies and integrative nature of delay-free engine model 64. Depending on desired input 32 and the implementation of Smith compensator 62, this ramping may create saturation errors in Smith compensator 62 resulting in the inability to achieve the desired results for controlled output 26.

Figure 11:
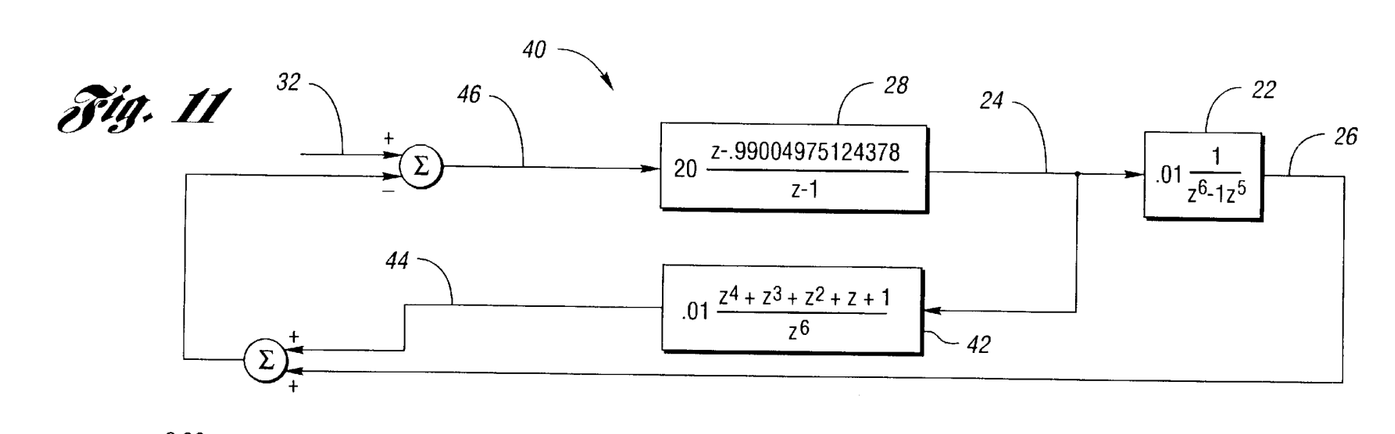
FIG. 11 is a block diagram of an exemplary engine control system with transport delay incorporating a compensator according to an embodiment of the present invention.

Referring now to FIG. 11, a block diagram of an exemplary engine control system with transport delay incorporating a compensator according to an embodiment of the present invention is shown. Compensator 42 generates compensation signal 44 by summing the previous five outputs of controller 28. The input to controller 28, error signal 46, is found by taking the difference between desired input 32 and the sum of controlled output 26 and compensation signal 44.

Figure 12:
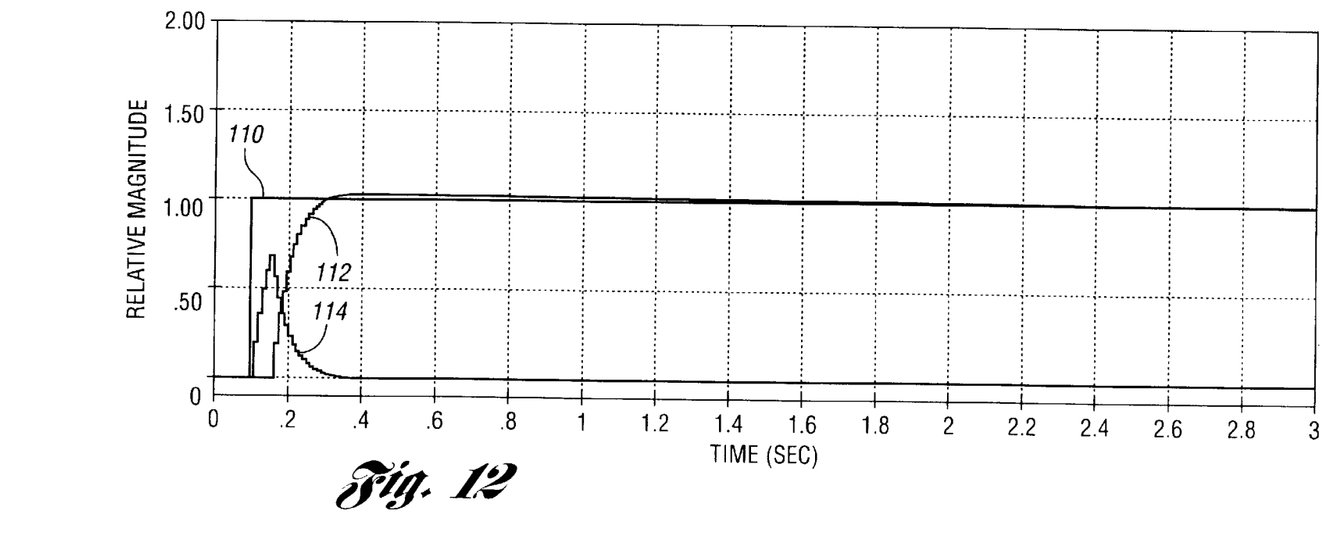
FIG. 12 is a graph of signals for the system modeled in FIG. 11.

Referring now to FIG. 12, a graph of signals for the system modeled in FIG. 11 is shown. Plot 110 illustrates a unit step input on desired input 32. Controlled output 26, shown by plot 112, closely tracks desired input 32 with a slight overshoot and minimal settling time. Compensation signal 44, shown by plot 114, decays to zero with substantially the same settling time as controlled output 26.

Figure 13:
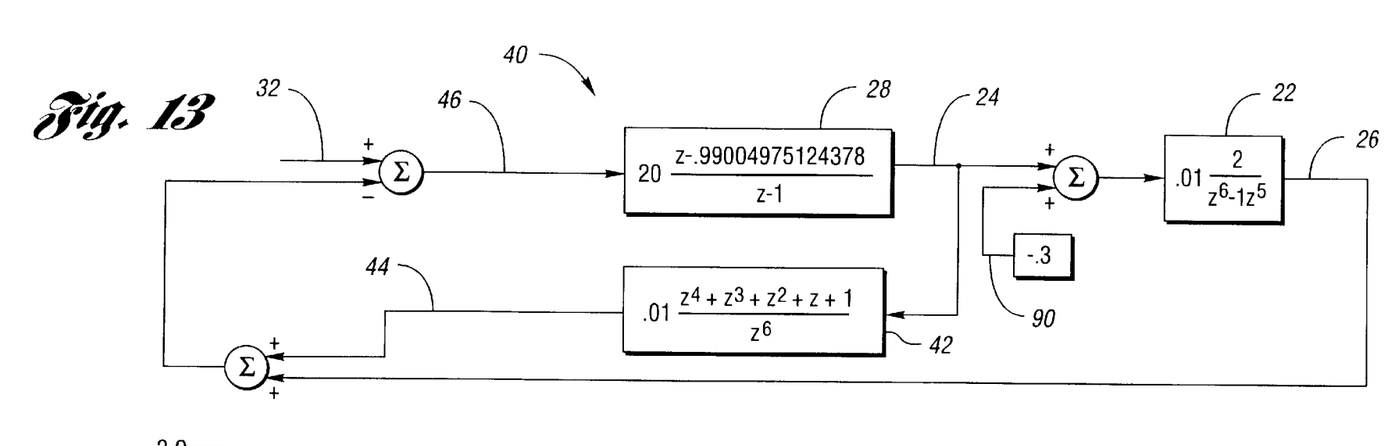
FIG. 13 is a block diagram of an exemplary engine control system with transport delay incorporating a compensator according to an embodiment of the present invention with model errors.

Referring now to FIG. 13, a block diagram of an exemplary engine control system with transport delay incorporating a compensator according to an embodiment of the present invention with model errors is shown. Once again, the open-loop gain for engine parameter 22 is doubled and parameter 22 is subject to constant disturbance input 90.

Figure 14:
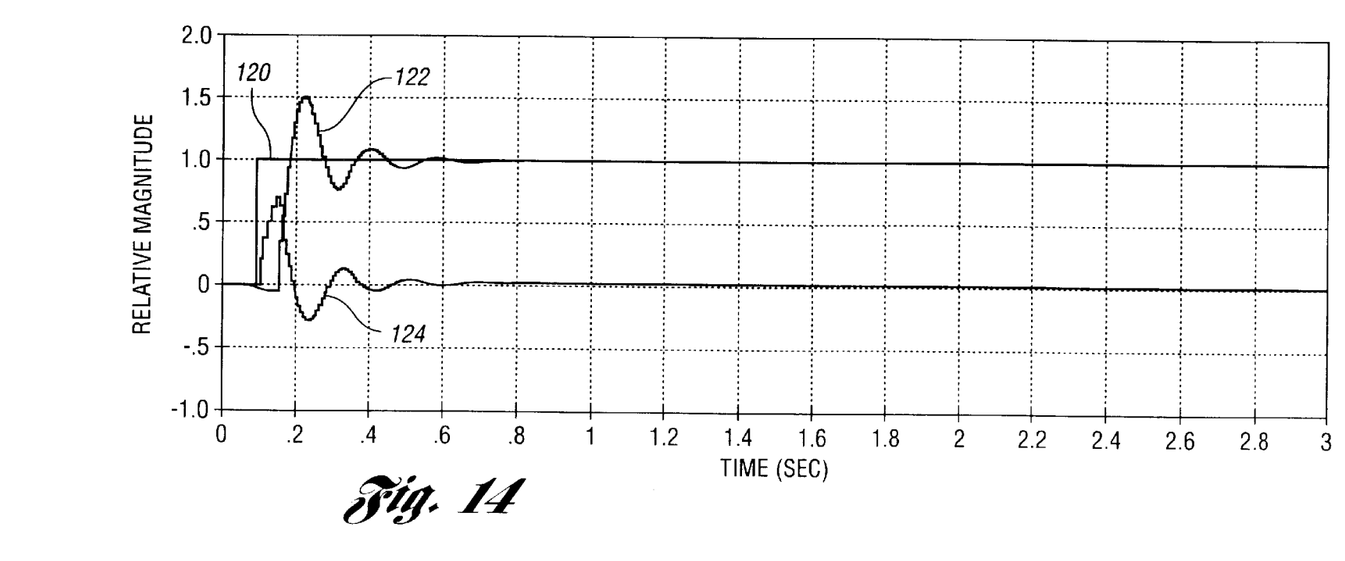
FIG. 14 is a graph of signals for the system modeled in FIG. 13.

Referring now to FIG. 14, a graph of signals for the system modeled in FIG. 13 is shown. Plot 120 illustrates a unit step input on desired input 32. Controlled output 26, as shown by plot 122, exhibits increased overshoot and settling time before following step input 120. Compensation signal 44, shown by plot 124, settles to zero with about the same settling time. Compensator 42 does not attempt to model engine parameter 22. Hence, there are no integrators in compensator 42 which may create a saturation error.

Figure 15:
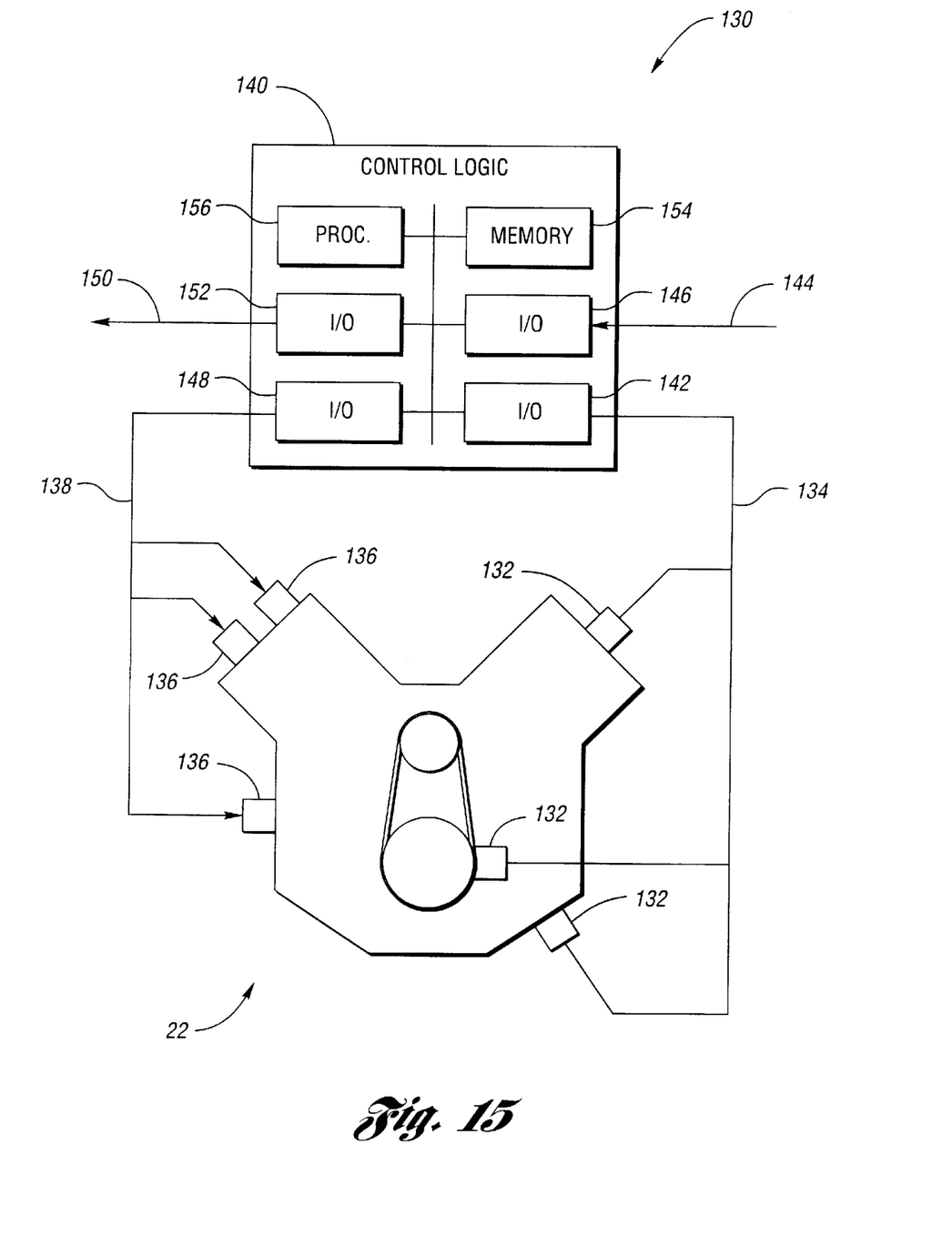
FIG. 15 is a schematic diagram of an engine with a control system according to an embodiment of the present invention.

Referring now to FIG. 15, a schematic diagram of an engine with a control system according to an embodiment of the present invention is shown. Engine 22 includes a control system, shown generally by 130, for controlling engine 22. Control system 130 includes one or more sensors 132 generating sensor signals 134 for directly or indirectly sensing at least one controlled output on engine 22. Control system 130 also includes one or more actuators 136 receiving control signals 138 for affecting one or more controlled output.

Control system 130 also includes control logic 140 implementing delay compensation. Input/output unit (I/O) 142 accepts sensor signals 134. Additional input signals 144, such as from other systems within a vehicle powered by engine 22 or by a person or computer providing control input for engine 22, may be received by input/output unit 146. Input/output unit 148 generates control signals 138. Additional output signals 150 may be generated by input/output unit 152 to control other systems within a vehicle powered by engine 22 or to provide status about engine 22. Memory 154 typically includes both volatile storage and non-volatile storage for holding engine calibration values, temporary calculation results, input and output values, executable code, and the like. Processor 156 executes code to read sensor signal values, calculate control signals based on compensating for delay inherent in engine 22, and output calculated control signals. While control logic 140 has been described as a conventional computer system, the present invention does not depend on the construction of control logic 140.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling an engine with transport delay measured as a delay period, the engine having a control input and a controlled output, the system comprising:

a controller in communication with the control input, the controller having an error input and a controller output;

a desired input; and a delay compensator operative to generate a compensation signal based on a sum of the controller output sampled only over the delay period;

wherein the error input is generated as the difference between the desired input and a sum of the controlled output and the compensation signal.

2. A system for controlling an engine as in claim 1, wherein the delay period is approximated by mT and T is a compensator sampling period, wherein y(n) is the controller output at the $n^{th}$ sampling period, and wherein K is a constant, the compensator output c(n) expressed as $$c(n) = K \sum_{i=1}^{m} y(n-i).$$

3. A system for controlling an engine as in claim 2 wherein the constant K is based on an engine open loop gain, the sampling period T, and engine inertia.

4. A method for controlling an engine with transport delay measured as a delay period, the engine having a control input and a controlled output, the method comprising:

generating a control signal for the control input, the control signal determined to control the engine as if the engine was without the delay, the control signal based on an error signal;

generating a compensating signal as a sum of the control signal sampled only over the delay period; and generating the error signal as the difference between a desired input and a sum of the controlled output and the compensating signal.

5. A method for controlling an engine as in claim 4, wherein the delay period is approximated by mI, wherein I is a sampling period used to generate the compensating signal, wherein y(n) is the control signal at the $n^{th}$ sampling period, and wherein K is a constant, the compensating signal c(n) expressed as:

$$c(n) = K\sum_{i=1}^{m} y(n-i).$$

6. A method for controlling an engine as in claim 5 wherein the constant K is based on the engine open loop gain, the sampling period T, and the engine inertia.

7. A compensator for an engine controller controlling an engine, the controller having a controller input and a controller output, the engine having a transport delay measured as a delay period, the engine having a controlled output and a control input, the control input connected to the controller output, an error signal is determined as the difference between a desired input and the controlled output, wherein the compensator is operative to:

(a) generate a compensation signal based on a sum of the controller output sampled only over the delay period, and (b) provide the controller input as a difference between the error signal and the compensation signal.

8. A compensator for an engine controller as in claim 7, wherein the delay period is approximated by mT and T is the compensator sampling period, wherein y(n) is the controller output at the $n^{th}$ sampling period, and wherein K is a constant, the compensator output c(n) expressed as:

$$c(n) = K\sum_{i=1}^{m} y(n-i).$$

9. A compensator for an engine controller as in claim 8 wherein the constant K is based on engine parameters and the sampling period T.

10. An internal combustion engine with transport delay measured as a delay period, the engine having a plurality of controlled parameters, for at least one controlled parameter having a control input and a controlled output, the engine comprising:

a feed-forward control path driving the control input with a control signal, the feed-forward control path designed to provide closed-loop control of the controlled parameter without the presence of transport delay; and a delay compensator generating a compensation signal based on a sum of the control signal sampled only over the delay period, the compensation signal providing an input to the feed-forward control path.

11. An internal combustion engine as in claim 10, wherein the delay period is approximated by mT and T is a compensator sampling period, wherein y(n) is the control signal at the $n^{th}$ sampling period, and wherein K is a constant, the compensation signal c(n) expressed as $$c(n) = K\sum_{i=1}^{m} y(n-i).$$

12. An internal combustion engine as in claim 11 wherein the constant K is based on an engine open loop gain, the sampling period T, and engine inertia.

* * * * *

UNITED STATES PATENT AND TRADEMARK OFFICE
CERTIFICATE OF CORRECTION

PATENT NO. : 6,564,141 B1 Page 1 of 1
DATED : May 13, 2003
INVENTOR(S) : S. Miller Weisman, II (Deceased)

It is certified that error appears in the above-identified patent and that said Letters Patent is hereby corrected as shown below:

Column 7,
Line 2, delete "ml" and insert therefor -- mT --.
Line 2, delete "I" and insert therefor -- T --.

Signed and Sealed this

Eighth Day of July, 2003

JAMES E. ROGAN
*Director of the United States Patent and Trademark Office*